US010992117B2

(12) United States Patent
Fackler et al.

(10) Patent No.: US 10,992,117 B2
(45) Date of Patent: Apr. 27, 2021

(54) CUTTING AND STRIPPING TOOL FOR RADIO FREQUENCY (RF) RADIATING COAXIAL CABLE

(71) Applicant: CommScope Technologies LLC, Hickory, NC (US)

(72) Inventors: Karl-Heinz Fackler, Wemding (DE); Gerhard Lang, Bavaria (DE); Johannes Kelnhofer, Bavaria (DE)

(73) Assignee: CommScope Technologies LLC, Hickory, NC (US)

(*) Notice: Subject to any disclaimer, the term of this patent is extended or adjusted under 35 U.S.C. 154(b) by 141 days.

(21) Appl. No.: 15/649,900

(22) Filed: Jul. 14, 2017

(65) Prior Publication Data

US 2018/0054047 A1    Feb. 22, 2018

Related U.S. Application Data

(60) Provisional application No. 62/378,017, filed on Aug. 22, 2016.

(51) Int. Cl.
*H02G 1/12* (2006.01)
(52) U.S. Cl.
CPC ............. *H02G 1/1212* (2013.01); *H02G 1/12* (2013.01); *H02G 1/1221* (2013.01); *H02G 1/1224* (2013.01); *H02G 1/1236* (2013.01)
(58) Field of Classification Search
CPC ...... H02G 1/1236; H02G 1/1212; H02G 1/12; H02G 1/1221; H02G 1/1224; H02G 1/005;

(Continued)

(56) References Cited

U.S. PATENT DOCUMENTS 2,217,077 A * 10/1940 Phillips ................ H02G 1/1212
  81/9.42
2,778,255 A * 1/1957 Miller .................. H02G 1/1229
  30/90.6

(Continued)

FOREIGN PATENT DOCUMENTS

| CN | 204597381 U | 8/2015 |
| GB | 705668 | 3/1954 |
| JP | 2000358309 A | 12/2000 |

OTHER PUBLICATIONS

Coastal Cable Tools (Coastal Tools), Special Instructions, Jul. 29, 2014 https://www.coasteltools.com/prod_ch_operating_inst.htm (Year: 2014).*

(Continued)

*Primary Examiner* — Tyrone V Hall, Jr.
*Assistant Examiner* — Abbie E Quann
(74) *Attorney, Agent, or Firm* — Fogg & Powers LLC

(57) ABSTRACT

One embodiment is directed to a tool to cut and strip a radiating coaxial cable. The tool comprises first and second jaws, a linkage that couples the first jaw to the second jaw, a cutting blade, and a stripping blade. The tool is configured to position at least a portion of the cutting blade to cut and sever the cable at a first point along the cable when the tool is rotated around the cable while the first jaw and the second jaw are closed around the cable. The tool is configured to position at least a portion of the stripping blade to cut the jacket of the cable, without severing the cable, at a second point along the cable when the tool is rotated around the cable while the first jaw and the second jaw are closed around the cable. Other embodiments are disclosed.

14 Claims, 12 Drawing Sheets

(58) Field of Classification Search
CPC .. H02G 1/229; B25B 7/10; B25B 7/16; B25B 7/18; B25B 7/123; B25B 7/02; B25B 7/04
USPC .......................................... 81/9.41, 9.43, 418
See application file for complete search history.

(56) References Cited

U.S. PATENT DOCUMENTS

| | | | | |
|---|---|---|---|---|
| 3,516,307 A | * | 6/1970 | Krampe | H02G 1/1212 81/9.43 |
| 3,913,425 A | * | 10/1975 | Iff | H02G 1/1212 81/9.43 |
| 4,766,669 A | * | 8/1988 | Schwartzman | H02G 1/1202 29/564.4 |
| 4,768,404 A | | 9/1988 | Biegasnki | |
| 4,799,406 A | * | 1/1989 | Diaz-De-Guerenu-Aguirrebeitia | H02G 1/1224 30/90.1 |
| 4,979,299 A | * | 12/1990 | Bieganski | H02G 1/1224 30/90.1 |
| 5,003,846 A | * | 4/1991 | Yagawa | G02B 6/245 30/90.6 |
| 2011/0113564 A1 | | 5/2011 | Liao et al. | |
| 2013/0152758 A1 | * | 6/2013 | Blackwell | B26D 3/001 83/743 |

OTHER PUBLICATIONS

Family Handyman, Stripping Wire, Underground Cable, Sep. 6, 2015 https://web.archive.org/web/20150906232855/http://www.familyhandyman.com/electrical/wiring/stripping-wire/view-all (Year: 2015).*
Coastal Cable Tools (Coastal Tools), Special Instruction, Jul. 29, 2014 https://www.coastaltools.com/prod_ch_operating_inst.htm (Year: 2014).*
European Search Report, "Extended European Search Report for EP Application No. 17179612.1", "Foreign counterpart to U.S. Appl. No. 15/649,900", dated Jan. 18, 2018, pp. 1-8, Published in: EP.
European Patent Office, "Office Action from EP Application No. 17179612.1 dated Oct. 2, 2018" From Foreign Counterpart of U.S. Appl. No. 15/649,900; pp. 1-9; Published in EP.
China National Intellectual Property Administration, "First Office Action from CN Application No. 201710709433.8", from Foreign Counterpart to U.S. Appl. No. 15/649,900, dated May 13, 2020, pp. 1 through 19, Published: CN.

\* cited by examiner

CUTTING AND STRIPPING TOOL FOR RADIO FREQUENCY (RF) RADIATING COAXIAL CABLE

CROSS-REFERENCE TO RELATED APPLICATION

This application claims the benefit of U.S. Provisional Patent Application Ser. No. 62/378,017 filed on Aug. 22, 2016, which is hereby incorporated herein by reference.

BACKGROUND

Radiating coaxial cables are commonly used to radiate radio-frequency (RF) signals in confined areas such tunnels. A radiating coaxial cable functions as a continuous distributed antenna. Slots are precisely formed in the outer conductor of the coaxial cable to enable the cable to be used to emit and receive RF signals.

An RF connector is typically installed on each end of a radiating coaxial cable. The installation of each RF connector needs to be done with a high degree of care in order to reduce passive intermodulation (PIM), which can cause distortion of the RF signals communicated via the cable. It can be difficult to install RF connectors on the ends of radiating coaxial cables with sufficiently low and stable PIM performance to comply with the specifications needed for deployments in harsh environments such as tunnels.

Typically, RF connectors are installed on the ends of a radiating coaxial cable by first cutting off an end of the cable using a hand saw. Cutting the cable with a hand saw can result in burrs or chips from the cable, as well as dirt, being introduced into the inner conductor of the cable, which can increase PIM. As a result, the cut end of the cable is cleaned with a brush. Properly cleaning the cut end of the cable with a brush can be time-consuming and difficult.

After cutting the cable, the outer insulating jacket near the cut end is stripped using a knife to peel the outer insulating jacket off the cable. This process is dangerous and typically requires a skilled technician to perform properly. The stripping process can result in deep cuts in the outer conductor of the cable, which can cause increase PIM and decrease the reliability of the overall system.

SUMMARY

One embodiment is directed to a tool to cut and strip a radiating coaxial cable. The radiating coaxial cable comprises an inner conductor, an outer conductor coaxially arranged around the inner conductor, an insulator disposed between the inner conductor and the outer conductor, and a jacket coaxially arranged around the inner conductor and the outer conductor. The tool comprises a first jaw, a second jaw, a linkage that couples the first jaw to the second jaw so that the first jaw and the second jaw are movable between an open state and a closed state, a cutting blade, and a stripping blade. The first jaw and the second jaw are configured to receive and hold the cable therebetween when the first jaw and the second jaw are in the closed state. The tool is configured to position at least a portion of the cutting blade to cut and sever the cable at a first point along the cable when the tool is rotated around the cable while the first jaw and the second jaw are in the closed state and the cable is received therebetween. The tool is configured to position at least a portion of the stripping blade to cut the jacket of the cable, without severing the cable, at a second point along the cable when the tool is rotated around the cable while the first jaw and the second jaw are in the closed state and the cable is received therebetween.

Another embodiment is directed to a method of cutting and stripping a radiating coaxial cable. The radiating coaxial cable comprises an inner conductor, an outer conductor coaxially arranged around the inner conductor, an insulator disposed between the inner conductor and the outer conductor, and a jacket coaxially arranged around the inner conductor and the outer conductor. The method comprises closing first and second jaws of a tool around the cable, wherein the tool further comprises a cutting blade and a stripping blade. The method further comprises rotating the tool around the cable to cut and sever the cable. The tool is configured to position at least a portion of the cutting blade to cut and sever the cable at a first point along the cable when the tool is rotated around the cable while the first jaw and the second jaw are closed around the cable. The tool is configured to position at least a portion of the stripping blade to cut the jacket of the cable, without severing the cable, at a second point along the cable when the tool is rotated around the cable while the first jaw and the second jaw are closed around the cable. The method further comprises removing a portion of the jacket resulting from cutting the jacket of the cable at the second point along the cable and attaching a RF connector at an end of the cable resulting from cutting and stripping the cable using the tool.

DRAWINGS

FIGS. 1A-1B are referred to here as "FIG. 1."

FIGS. 8A-8B are referred to here as "FIG. 8."

DETAILED DESCRIPTION

Figure 1A:
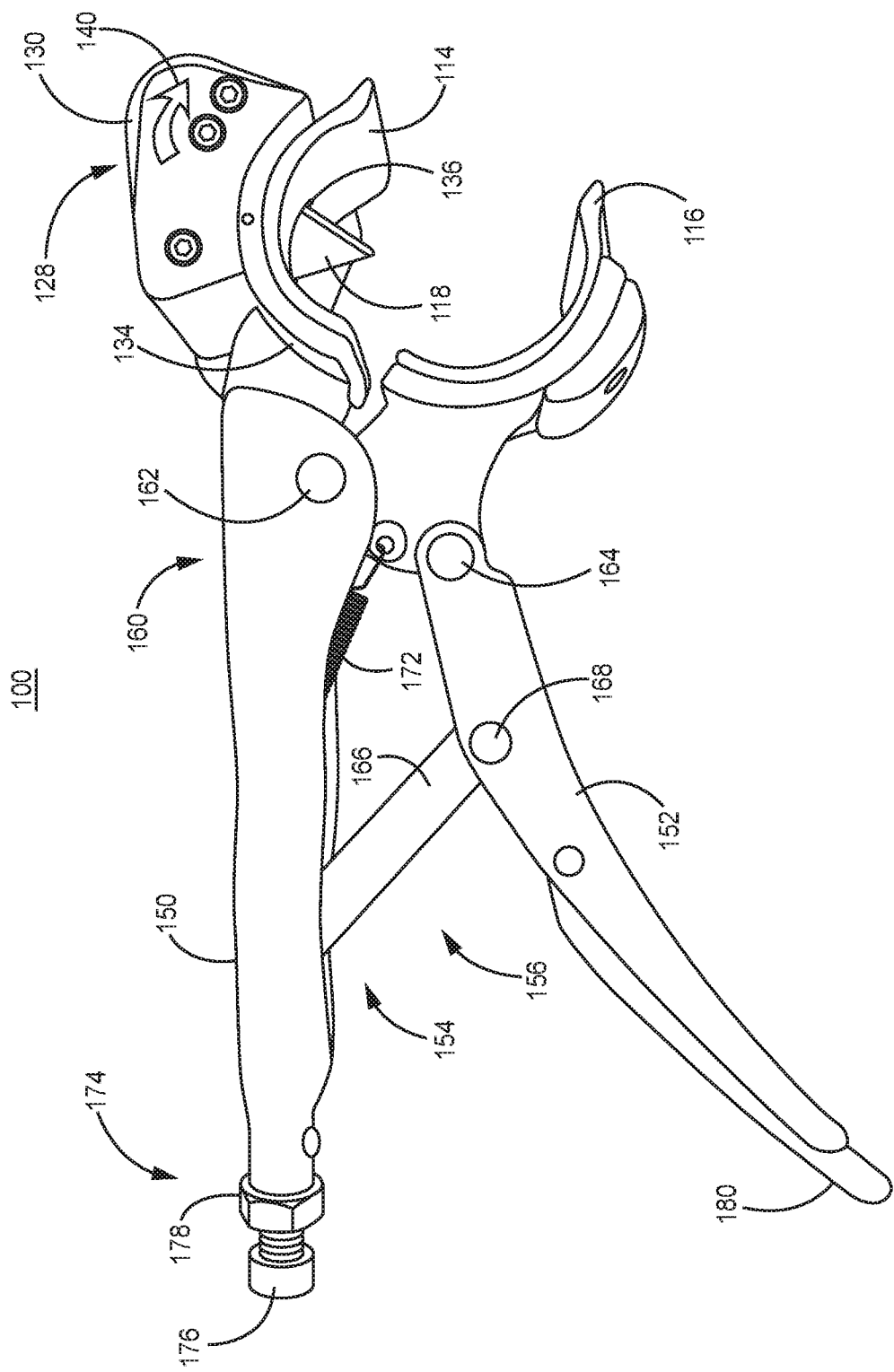
FIGS. 1A-1B are side views of a first side of one exemplary embodiment of a tool while in an open state. Collectively.
Figure 1B:
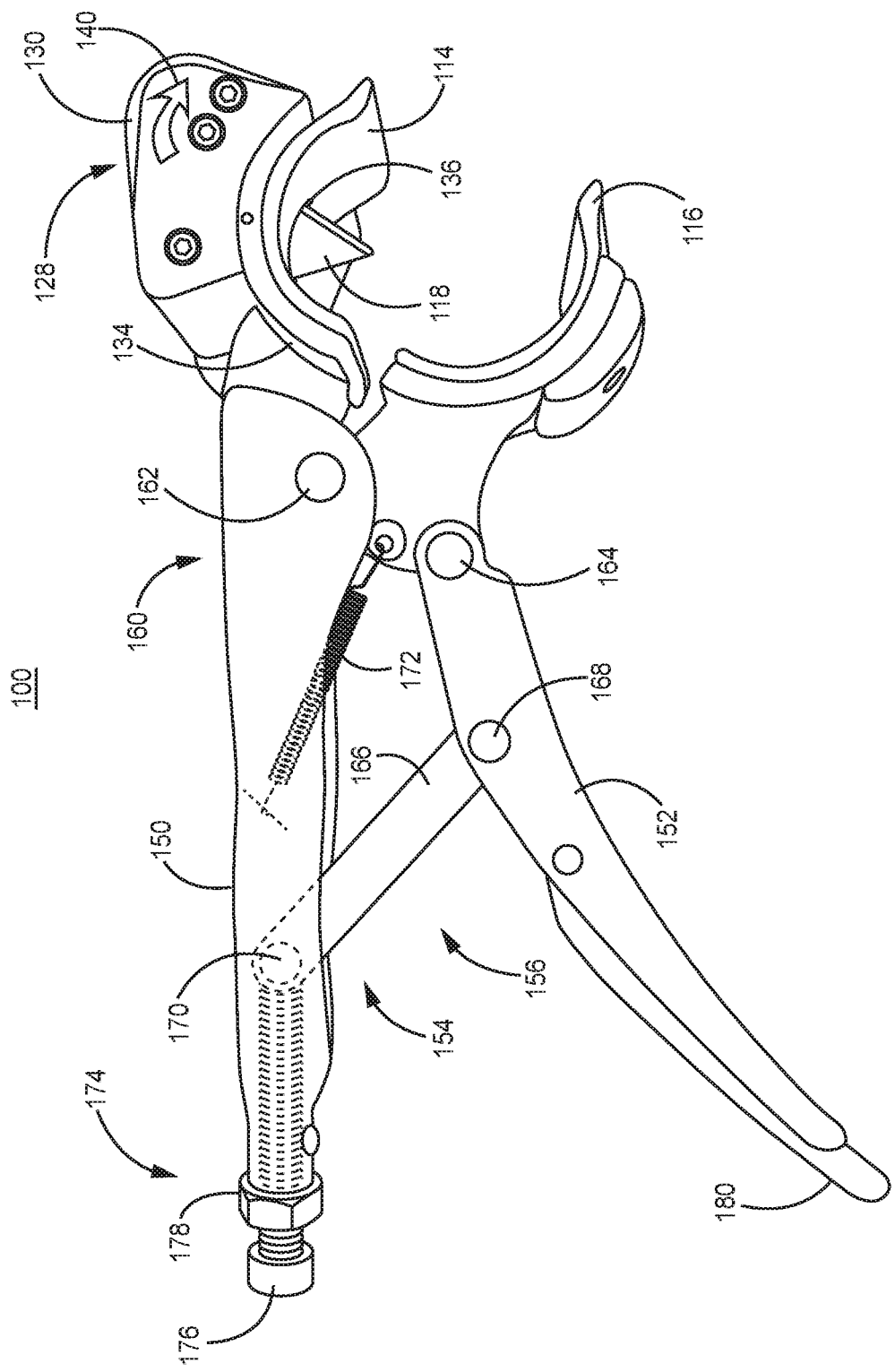
Figure 2:
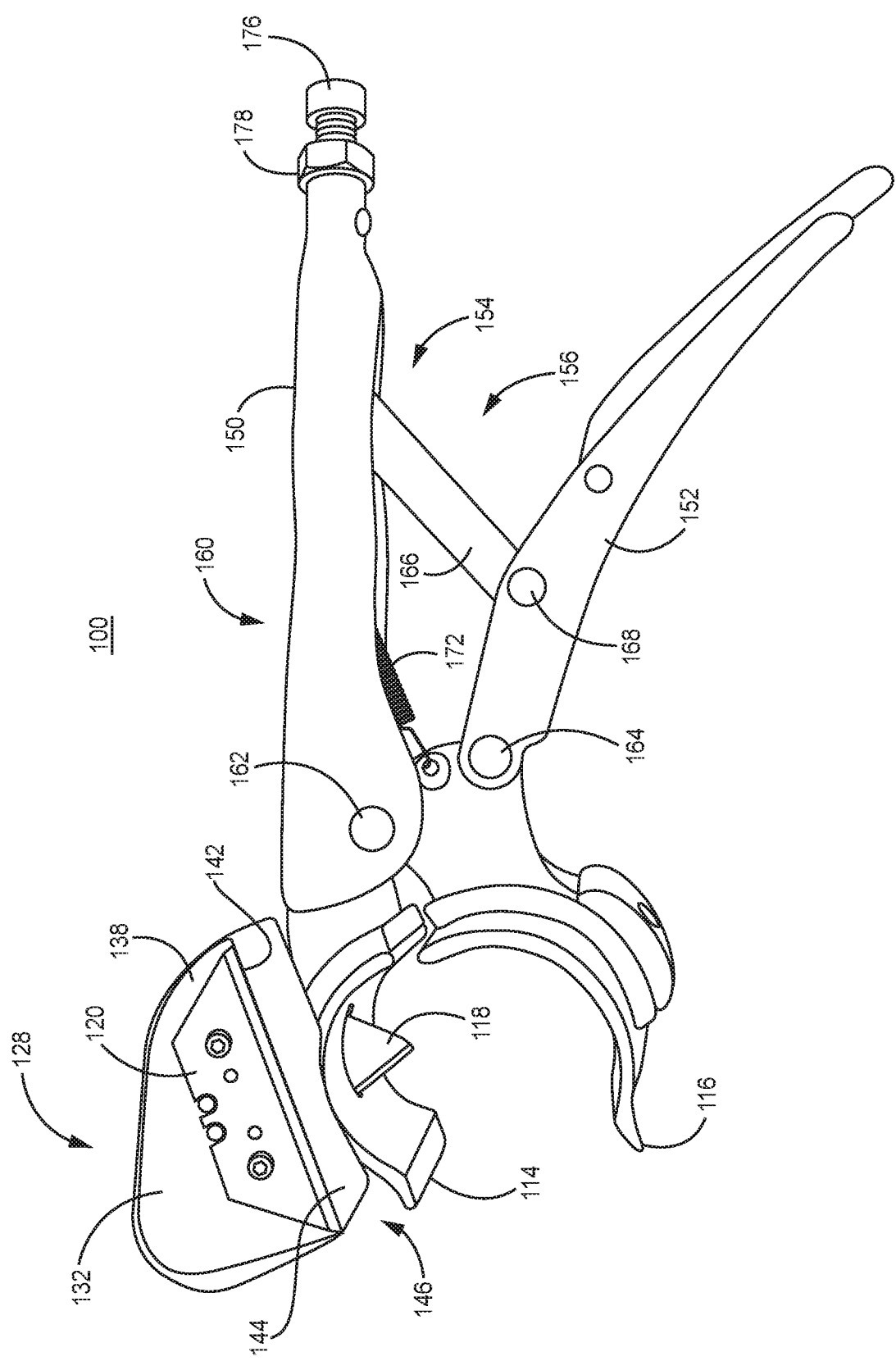
FIG. 2 is a side view of a second side of the tool of FIG. 1 while in an open state.

FIGS. 1-7 are diagrams illustrating one exemplary embodiment of a tool 100 to cut and strip a radio frequency (RF) radiating coaxial cable 102. The tool 100 can be configured for burr-less and chip-less cutting and stripping of an RF radiating coaxial cable 102. As shown in FIG. 8, the RF radiating coaxial cable 102 comprises an inner conductor 104, an outer conductor 106 coaxially arranged around the inner conductor 104, an insulator 108 disposed between the inner conductor 104 and the outer conductor 106, and a jacket 110 coaxially arranged around the inner conductor 104 and the outer conductor 106. A raised line 112 is formed on the jacket 110 of the cable 102.

Referring again to the embodiment shown in FIGS. 1-7, the tool 100 comprises a first jaw 114, a second jaw 116, a cutting blade 118, and a stripping blade 120. In general, the first jaw 114 and the second jaw 116 are configured to receive and hold the cable 102 between the first jaw 114 and the second jaw 116 when the first jaw 114 and the second jaw 116 are in a closed state. The tool 100 is configured to position at least a portion of the cutting blade 118 to cut and sever the cable 102 at a first point 122 along the cable 102 when the tool 100 is rotated around the cable 102 while the first jaw 114 and the second jaw 116 are in the closed state and the cable 102 is received between the first jaw 114 and the second jaw 116. Also, the tool 100 is configured to position at least a portion of the stripping blade 120 to cut the jacket 110 of the cable 102, without severing the cable 102, at a second point 124 along the cable 102 when the tool 100 is rotated around the cable 102 while the first jaw 114 and the second jaw 116 are in the closed state and the cable 102 is received between the first jaw 114 and the second jaw 116.

Figure 9A:
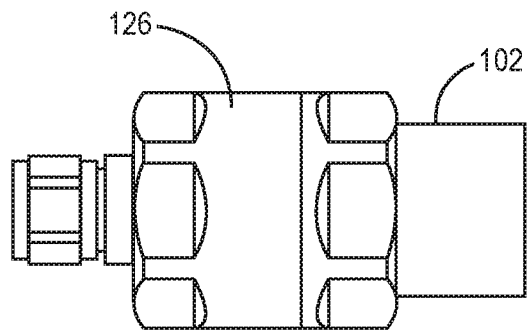
FIGS. 9A-9B are side views of RF connectors that can be attached to the end of the RF radiating coaxial cable shown in FIG. 8.
Figure 9B:
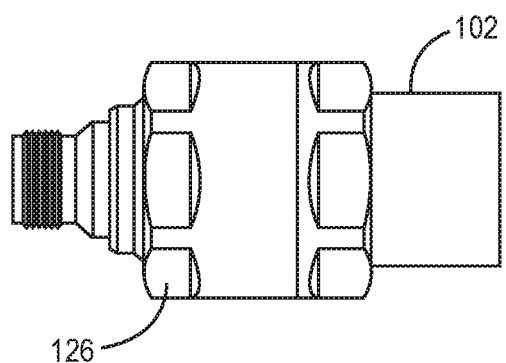

The first point 122 along the cable 102 referred to above is where the tool 100 (more specifically, the cutting blade 118) completely cuts and severs the cable 102 to create a cleanly cut end of the cable 102. The second point 124 along the cable 102 referred to above is where the tool 100 (more specifically, the stripping blade 120) cuts the jacket 110 of the cable 102 in order to strip the jacket 110 of the cable 102 off of the cable 102. The tool 100 is configured so that the second point 124 is separated from the first point 122 by a distance that is required for the particular RF connector 126 that is being attached to the cut end of the cable 102. For example, in one example, where the RF connector 126 comprises a 7-16 Deutsches Institut für Normung (DIN) male or female connector (shown in FIGS. 9A and 9B, respectively) for a RADIAX® RCT5 radiating coaxial cable, the second point 124 should be separated from the first point 122 by 25 millimeters. It is to be understood, however, that other RF connectors can be attached to other types of RF radiating coaxial cables and the distance between the first and second points along the cable will likely be different.

In the exemplary embodiment shown in FIGS. 1-7, the tool 100 comprises a blade assembly 128 that comprises first and second members 130 and 132. The first member 130 is mounted to the outer surface 134 of the first jaw 114 (for example, using one or more bolts or other fasteners).

A slit 136 is formed in the first jaw 114. A corresponding slit (not shown) is formed in the first member 130. The slit 136 in the first jaw 114 and the slit in the first member 130 are positioned to align with each other when the first member 130 is attached to the first jaw 114. The cutting blade 118 is inserted into the aligned slits. The cutting blade 118 can be held in place using an appropriate fastener (for example, by screwing a bolt through a threaded hole formed in the first member 130 positioned so that that the bolt will pass through the hole in the cutting blade 118 while the cutting blade 118 is inserted into the slits).

In the exemplary embodiment shown in FIGS. 1-7, the second member 132 of the blade assembly 128 is attached to the first member 130 of the blade assembly 128 (for example, using a pair of bolts or other fasteners).

The stripping blade 120 is attached to an outer side 138 of the second member 132 (for example, using one or more bolts or other fasteners).

The cutting blade 118 is held in the tool 100 so as to position a portion of the cutting edge of the cutting blade 118 in the area between the inner surfaces of the first and second jaws 114 and 116 when the first and second jaws 114 and 116 are in a closed state. In the exemplary embodiment shown in FIGS. 1-7, a pointed end of the cutting blade 118 pierces the cable 102 when the jaws 114 and 116 are closed around the cable 102.

Figure 6:
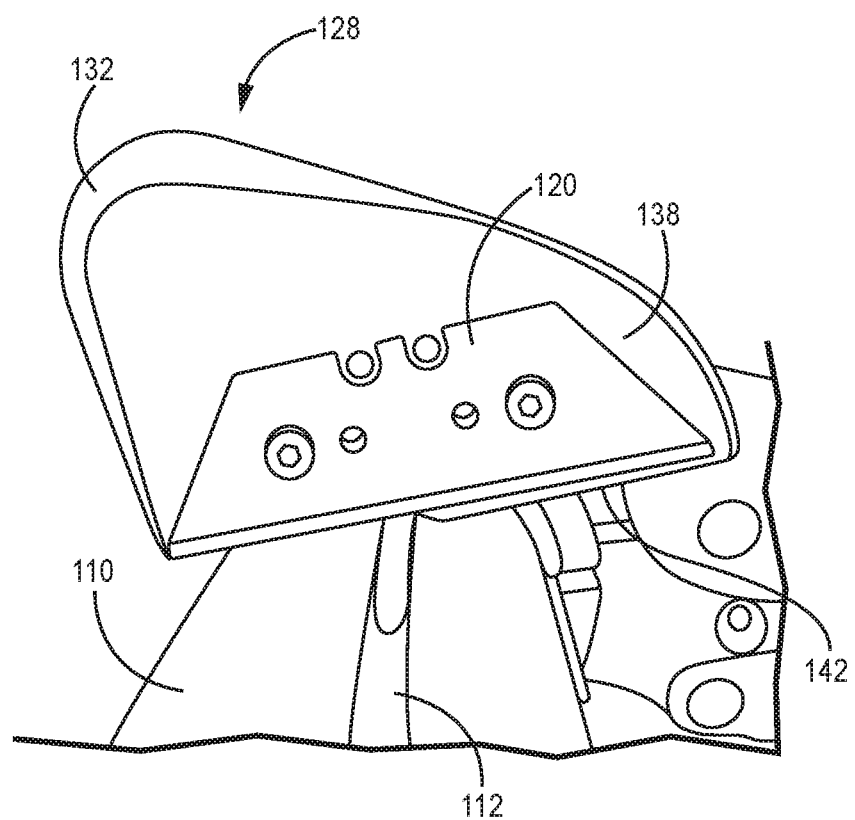
FIG. 6 is a detailed view of the second side of the tool of FIG. 1 closed around a RF radiating coaxial cable.
Figure 7:
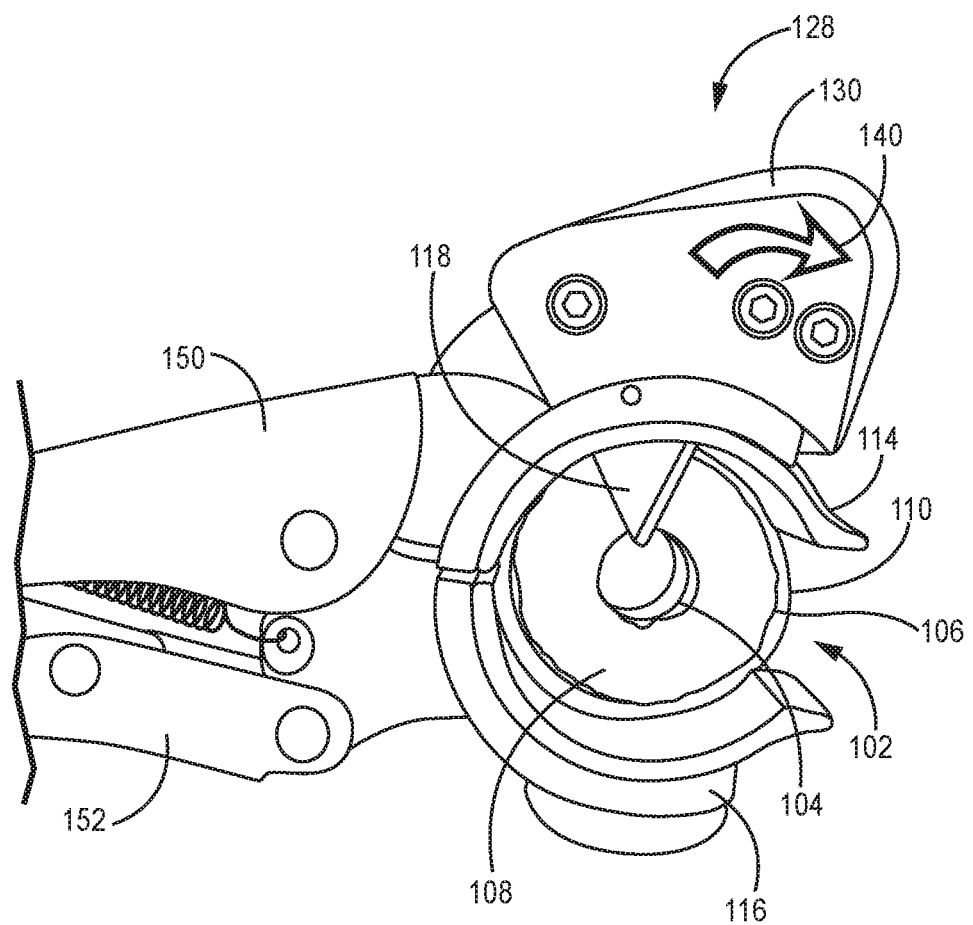
FIG. 7 is a detailed view of the first side of the tool of FIG. 1 closed around a RF radiating coaxial cable after the cable has been cut and severed.
Figure 8A:
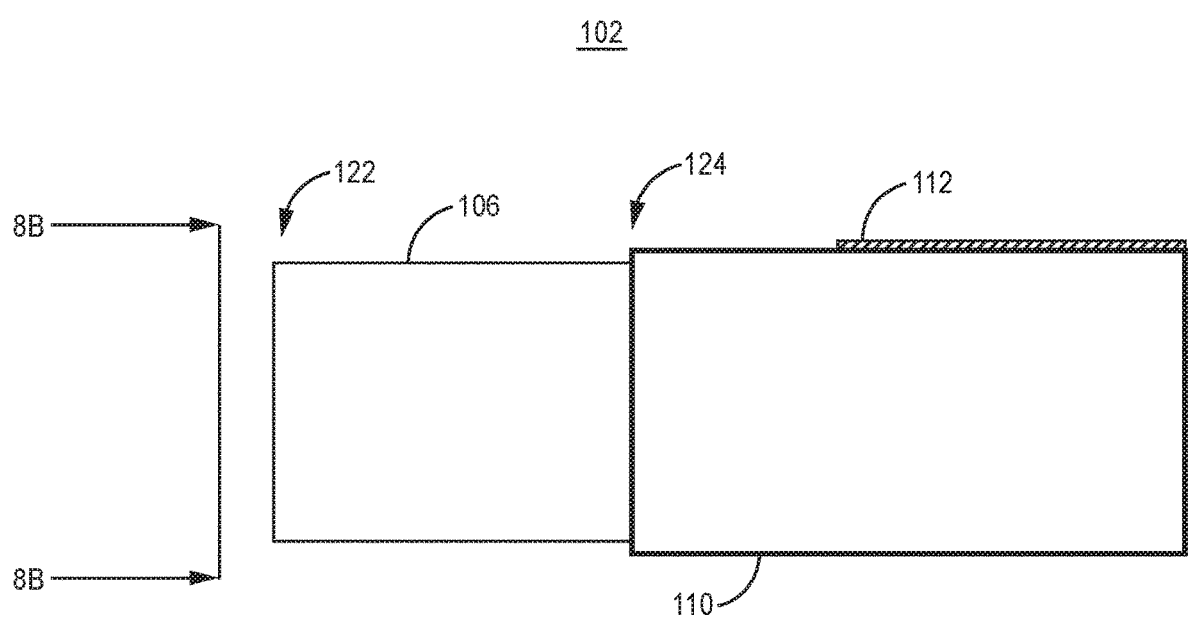
FIG. 8A is a side view of a radio frequency (RF) radiating coaxial cable that can be cut and stripped using the tool of FIG. 1.
Figure 8B:
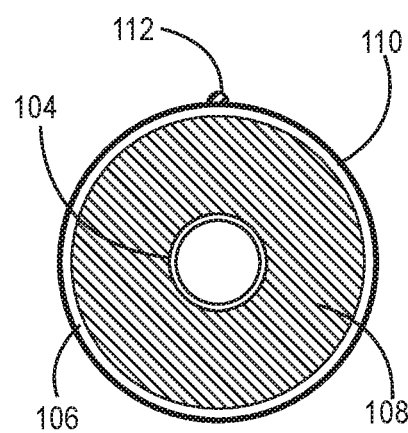
FIG. 8B is a cross-sectional view of the RF radiating coaxial cable shown in FIG. 8A. Collectively.

As shown in FIG. 7, the tool 100 is configured so that enough of the cutting blade 118 protrudes into the area between the first and second jaws 114 and 116 that the cutting blade 118 is able to cut through the jacket 110, the outer conductor 106, the insulator 108, and the inner conductor 104 when the jaws 114 and 116 are closed around the cable 102. The cable 102 can then be severed by rotating the tool in the direction of the cutting edge of the cutting blade 118, which causes the cutting edge of the cutting blade 118 to cut through the jacket 110, the outer conductor 106, the insulator 108, and the inner conductor 104 all the way around the cable 102. In the exemplary embodiment shown in FIGS. 1-7, an arrow 140 is printed on one or more of the sides of the tool 100 to indicate to a user which direction to rotate the tool 100 in order to cut and sever the cable 102.

Also, as shown in FIG. 6, the tool 100 is configured so that the cutting edge of the stripping blade 120 will cut through the jacket 110 of the cable 102 but not through the outer conductor 106 or other inner portions of the cable 102 when the first and second jaws 114 and 116 are closed around the cable 102. When the tool 100 is rotated around the cable 102, the cutting edge of the stripping blade 120 cuts through the jacket 110 all the way around the circumference of the cable 102.

Figure 3:
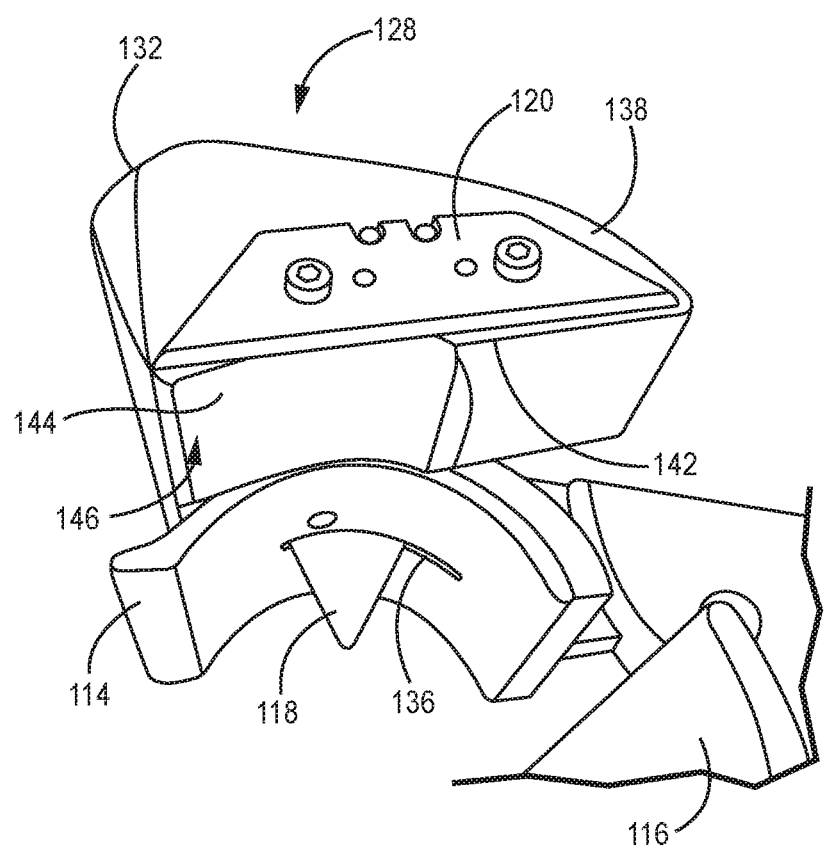
FIG. 3 is a detailed view of the first jaw of the tool shown in FIG. 2.

In the exemplary embodiment shown in FIGS. 1-7, the cutting edge of the stripping blade 120 is appropriately positioned by attaching the stripping blade 120 to the outer side 138 of the second member 132 so that the cutting edge of the stripping blade 120 is near the bottom edge 142 of the second member 132. As shown in FIG. 3, for a portion of the length of the bottom edge 142 of the second member 132, the cutting edge of the stripping blade 120 does not extend below the bottom edge 142 of the second member 132 and, as a result, the cutting edge is not able to cut for that portion. Also, as shown in FIG. 3, the second member 132 includes a concave surface 144 formed in its bottom surface 146 so that a concave curve is formed in the bottom edge 142 the second member 132. As a result, the cutting edge of the stripping blade 120 extends below the bottom edge 142 of the second member 132 for a portion of the bottom edge 142 and, as a result, the cutting edge is able to cut a cable 102 when the jaws 114 and 116 of the tool 100 are closed around the cable 102.

As noted above, the tool 100 is configured so that the second point 124 is separated from the first point 122 by a distance that is required for the particular RF connector 126 that is being attached to the cut end of the cable 102. In the exemplary embodiment shown in FIGS. 1-7, the distance between the first point 122 and the second point 124 is configured based on the positioning of the slit 136 in the first jaw 114 and the slit in the first member 130, respectively, and the outer side 138 of the second member 132. The positioning of the outer side 138 of the second member 132 can be configured based on the width of the second member 132, the width of the first member 130, and/or where the blade assembly 128 and/or the second member 132 are attached to the rest of the tool 100. The positioning of the outer side 138 of the second member 132 can be configured in other ways.

FIGS. 1-7 illustrate one exemplary embodiment of a tool 100 and one example of how the cutting and stripping blades 118 and 120 can be attached to (or otherwise included as a part of) the tool 100 and positioned relative to a cable 102 for cutting and stripping. However, it is to be understood that the tool 100 can be implemented in other ways (for example, where the cutting and stripping blades 118 and 120 can be attached to (or otherwise included as a part of) the tool 100 in other ways and where the cutting and stripping blades 118 and 120 can be positioned relative to a cable 102 for cutting and stripping).

In the exemplary embodiment shown in FIGS. 1-7, the tool 100 comprises a pliers having a first handle 150 and a second handle 152. It is to be understood, however, that the tool 100 can be implemented in other ways (for example, in other non-pliers tools). In this exemplary embodiment, the tool 100 further comprises a linkage 154 that couples the first jaw 114 to the second jaw 116 so that the first jaw 114 and the second jaw 116 are movable between an open state (shown in FIGS. 1-3) and a closed state (shown in FIGS. 4-7). In the exemplary example shown in FIGS. 1-7, the linkage 154 is configured to couple the first and second handles 150 and 152 to the first and second jaws 114 and 116, respectively, so that the first and second jaws 114 and 116 are moved into an open state when the first and second handles 150 and 152 are opened and so that the first and second jaws 114 and 116 are moved into a closed state when the first and second handles 150 and 152 are squeezed together.

In the exemplary embodiment shown in FIGS. 1-7, the linkage 154 is implemented as a conventional four-bar linkage of the type used in locking pliers (also sometimes referred to as "vise grips"). In this exemplary embodiment, the first jaw 114 and the first handle 150 are formed as a part of a single, fixed member 160. The second jaw 116 is attached to the fixed member 160 via first pivot point 162 so that the second jaw 116 is able to pivot at the first pivot point 162 and move relative to the fixed member 160.

The second handle 150 is coupled to the second jaw 116 via a second pivot point 164. A link member 166 is coupled to the second handle 152 via a third pivot point 168 and to the first handle 150 via a fourth pivot point 170.

The link member 166 and the second handle 152 function as an over-the-center linkage. When the first and second handles 150 and 152 of the tool 100 are opened, the angle formed between the link member 166 and the second handle 152 will be between around 90 degrees and less than 180 degrees. This also results in the jaws 114 and 116 being in an open state. When the first and second handles 150 and 152 of the tool 100 are squeezed together, the second handle 152 and the second jaw 116 rotate relative to each to cause the angle formed between the link member 166 and the second handle 152 to become 180 degrees or more, which causes the first and second jaws 114 and 116 to be locked into a closed state.

In the exemplary embodiment shown in FIGS. 1-7, the tool 100 further comprises a spring 172 that is coupled between the second jaw 116 and the first handle 150 in order to bias the tool 100 towards being in an open state.

In the exemplary embodiment shown in FIGS. 1-7, the tool 100 further comprises an adjustment mechanism 174 that is configured to adjust the separation between the jaws 114 and 116 when in a closed state. In this exemplary embodiment, the adjustment mechanism 174 comprises a thumbscrew 176 that can be screwed in and out of a nut 178 attached to the first handle 150 in order to change the location of the fourth pivot point 170 and, consequently, the effective length of the link formed between the first pivot point 162 and the fourth pivot point 170.

In the exemplary embodiment shown in FIGS. 1-7, the tool 100 further comprises an unlocking lever 180 that can be used to unlock the pliers.

As noted above, FIGS. 1-7 illustrate one exemplary embodiment of a tool 100 where the tool 100 is implemented as a locking pliers. However, it is to be understood that the tool 100 can be implemented in other ways (for example, where the tool 100 is implemented as a different type of pliers, such as a pliers with a two-bar linkage, or as a non-pliers tool such as a clamp-type tool with or without a latch).

Figure 10:
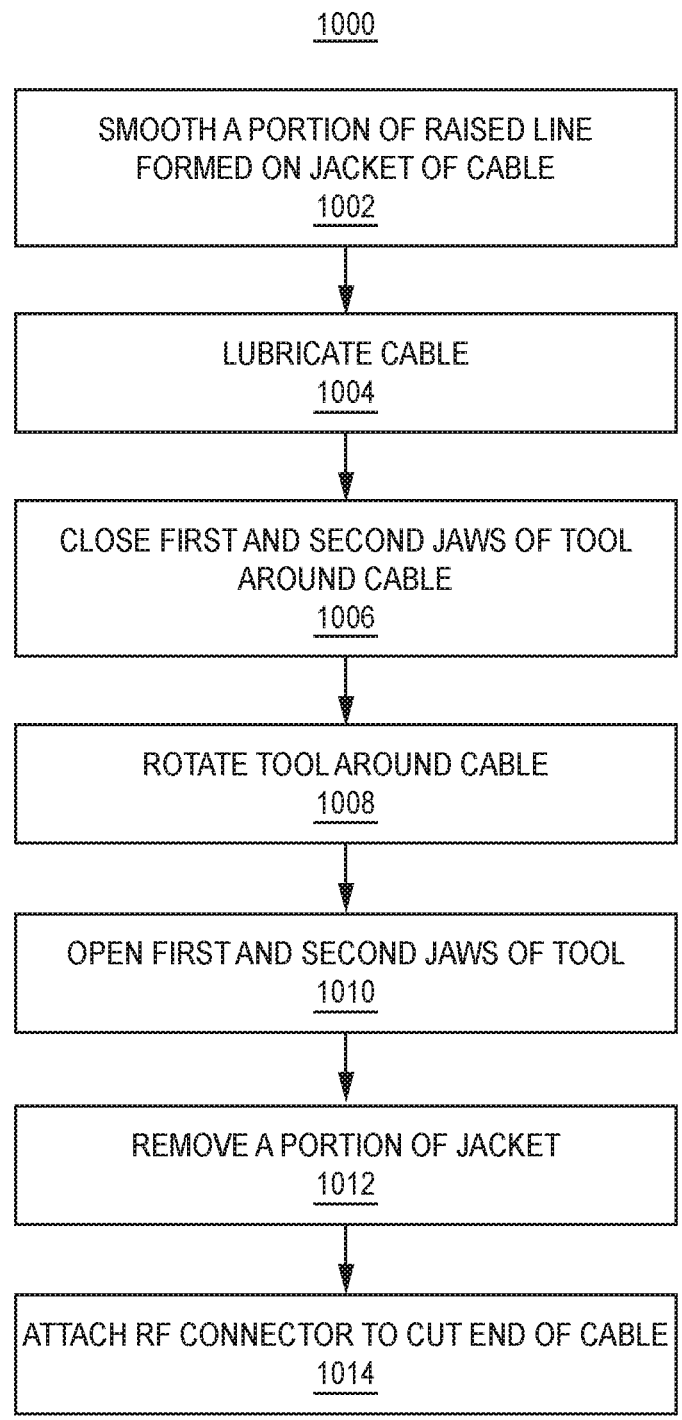
FIG. 10 is a flow diagram of one exemplary embodiment of a method of cutting and stripping a radiating coaxial cable.

FIG. 10 is a flow diagram of one exemplary embodiment of a method 1000 of cutting and stripping a RF radiating coaxial cable. The embodiment of method 1000 shown in FIG. 10 is described here as being implemented using the tool 100 described above in connection with FIGS. 1-7 (though it is to be understood that other embodiments can be implemented in other ways). Method 1000 can be used for burr-less and chip-less cutting and stripping of an RF radiating coaxial cable 102.

Method 1000 comprises smoothing a portion of the raised line 112 formed on the jacket 110 of the cable 102 (block 1002). The raised line 112 is smoothed in the portion of the cable 102 where the cutting and stripping is to be performed. In one exemplary embodiment, this is done using an appropriate hand tool (such as a knife or chisel) to peel the raised line 112 off of the jacket 110 of the cable 102. This is typically done before closing the first and second jaws 114 and 116 around the cable 102 as described below.

Method 1000 further comprises lubricating the cable 102 (block 1004). The portion of the cable 102 where the cutting and stripping is to be performed is lubricated. This is typically done before closing the first and second jaws 114 and 116 around the cable 102 as described below. An appropriate lubricant, such as a silicone spray, can be applied to the cable 102 (for example, by spraying the cable 102 with the lubricant).

Figure 4:
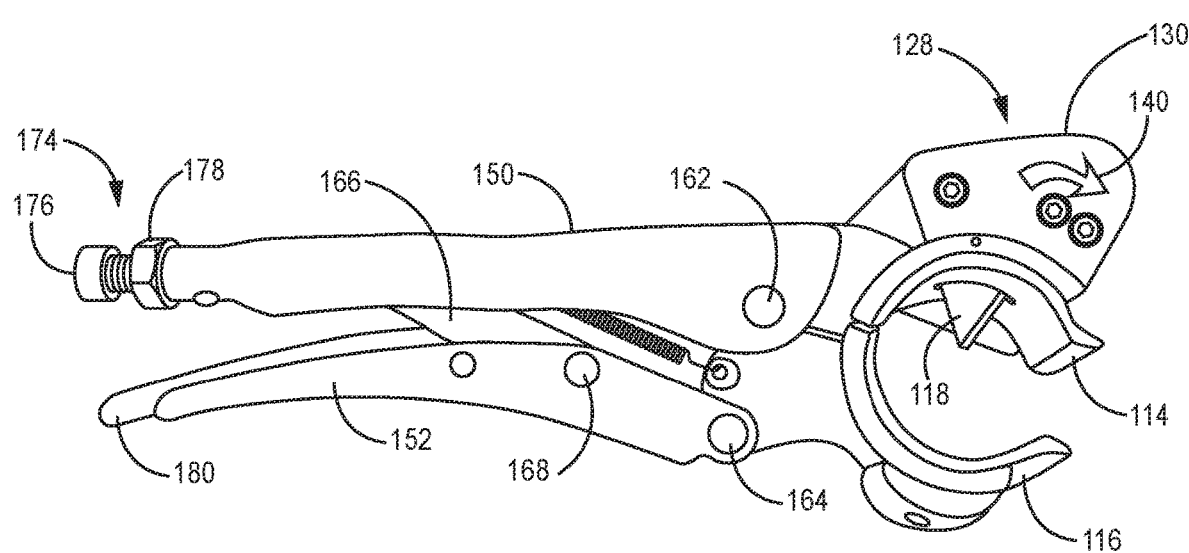
FIG. 4 is a side view of the first side of the tool of FIG. 1 while the tool is in a closed state.
Figure 5:
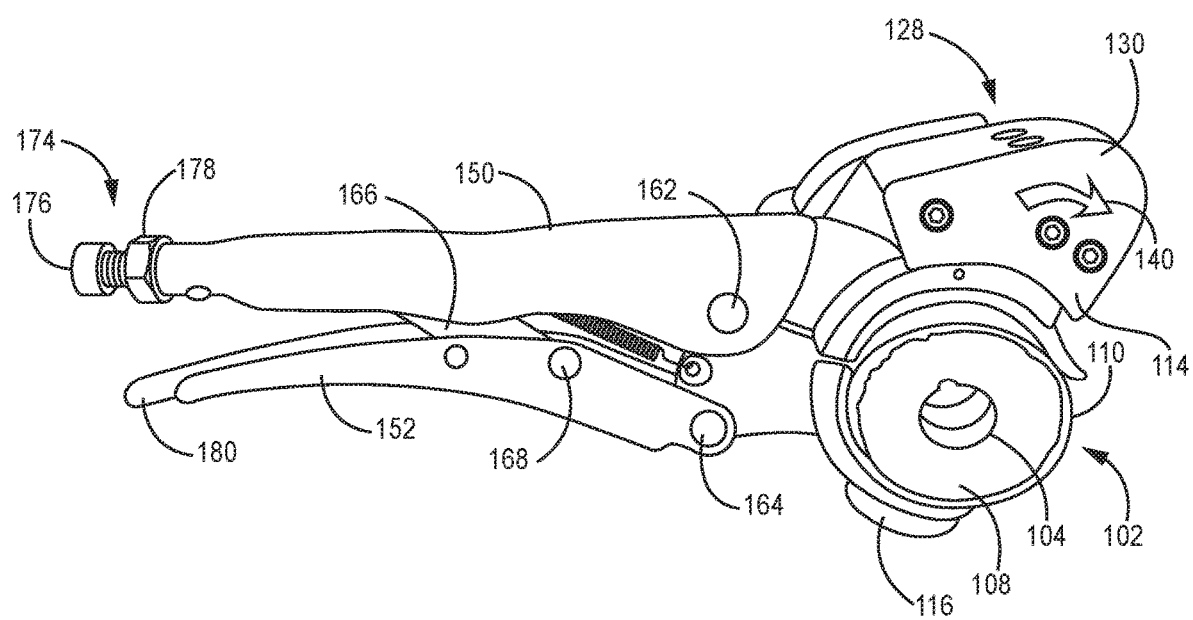
FIG. 5 is a perspective view of the first side of the tool of FIG. 1 closed around a RF radiating coaxial cable.

Method 1000 further comprises closing the first and second jaws 114 and 116 of the tool 100 around the cable 102 (block 1006). Where the tool 100 is implemented as a pliers as described above, the cable 102 is positioned between the first and second jaws 114 and 116 of the tool 100 and a user squeezes the first and second handles 150 and 152, which causes the first and second jaws 114 and 116 to close and ultimately to be positioned in a closed state (as shown in FIG. 4). As noted above, doing this causes the cutting blade 118 to pierce the cable 102 and cut through the jacket 110, the outer conductor 106, the insulator 108, and the inner conductor 104 of the cable 102 at the first point 122 along the cable 102. Also, as noted above, closing the first and second jaws 114 and 116 of the tool 100 around the cable 102 causes the stripping blade 120 to cut the jacket 110 of the cable 102 at the second point 124 along the cable 102 (but not cut the outer conductor 106, the insulator 108, and the inner conductor 104 of the cable 102).

Also, where the tool 100 is implemented as a pair of locking pliers as described above, the first and second jaws 114 and 116 can be locked around the cable 102 by using the locking mechanism 156. More specifically, with such a tool 100, this is done by squeezing the first and second handles 150 and 152 of the tool 100 together, which causes the second handle 152 and the second jaw 116 to rotate relative to each other thereby causing the angle formed between the link member 166 and the second handle 152 to become 180 degrees or more. This causes the first and second jaws 114 and 116 to be locked into a closed state. By locking the first and second jaws 114 and 116 around the cable 102 by using the locking mechanism 156, the stripping blade 120 can be prevented from cutting the outer conductor 106 (or other inner parts) of the cable 102. Also, locking the tool 100 can make it easier for a user to rotate the tool 100 as described below in a clean and uniform manner.

Method 1000 further comprises rotating the tool 100 around the cable 102 to cut and sever the cable 102 (block 1008). The tool 100, in this exemplary embodiment, is rotated in the cutting direction indicated by the arrow 140 on the tool 100 and the tool 100 is rotated more than 360 degrees around the cable 102.

As noted above, the tool 100 is configured to position at least a portion of the cutting blade 118 to cut and sever the cable 102 at the first point 122 along the cable 102 when the tool 100 is rotated around the cable 102 while the first jaw 114 and the second jaw 116 are closed around the cable 102. Also, as noted above, the tool 100 is configured to position at least a portion of the stripping blade 120 to cut the jacket 110 of the cable 102, without severing the cable 102, at a second point 124 along the cable 102 when the tool 100 is rotated around the cable 102 while the first jaw 114 and the second jaw 116 are closed around the cable 102.

In this exemplary embodiment, the lubricant described above is applied in order to facilitate the rotation of the tool 100 around the cable 102 (though it is to be understood that in other embodiments a lubricant is not used).

Method 1000 further comprises opening the first and second jaws 114 and 116 of the tool 100 that were previously surrounding the cable 102 (block 1010). In one implementation, the tool 100 is rotated 180 degrees in the direction opposite to the cutting direction indicated by the arrow 140 before opening the first and second jaws 114 and 116 of the tool 100. This is done in order to release any torque that may have developed on the cable 102 by virtue of rotating the tool 100 around the cable 102 in the cutting direction. After opening the first and second jaws 114 and 116, the tool 100 can be removed from the cable 102. Where the tool 100 is implemented as a pliers as described above, the user opens the first and second handles 150 and 152, which causes the first and second jaws 114 and 116 to open and ultimately to be positioned in an open state.

Also, where the tool 100 is implemented as a pair of locking pliers as described above and the first and second jaws 114 and 116 are locked around the cable 102, the locking mechanism 156 is unlocked in connection with opening the first and second jaws 114 and 116. More specifically, with such a tool 100, this is done by separating the first and second handles 150 and 152 of the tool 100, which causes the second handle 152 and the second jaw 116 to rotate relative to each thereby causing the angle formed between the link member 166 and the second handle 152 to be between around 90 degrees and less than 180 degrees. This causes the first and second jaws 114 and 116 to be unlocked and able to move into an open state.

Method 1000 further comprises, after the first and second jaws 114 and 116 of the tool 100 are opened and the tool 100 is removed from the cable 100, removing a portion of the jacket 110 resulting from cutting the jacket 110 of the cable 102 at the second point 124 along the cable (block 1012). Because of the orientation of the stripping blade 120, the jacket 110 should slide off the rest of the cable 102, resulting in the stripping of the jacket 110.

Method 1000 further comprises attaching a RF connector 126 to the cut end of the cable 102 that results from cutting and stripping the cable 102 using the tool 100 (block 1014). The RF connector 126 can be attached to the cut end of the cable 102 in a conventional manner.

For example, where the RF connector 126 comprises a 7-16 DIN male or female connector (shown in FIGS. 9A and 9B, respectively) for a RADIAX® RCT5 radiating coaxial cable, first the clamping nut of the RF connector 126 is slid over the cut end of the cable 102 so that the threaded end of the clamping nut faces the end of the cable 102 and so that the clamping nut covers the second point 124. Then, the clamp ring of the RF connector 126 is placed over the cut end of the cable 102, with the tapered end of the clamp ring towards the clamping nut. The clamp ring and is slid down towards the clamping nut so that the clamp ring abuts the clamping nut. Then, the outer conductor 110 is separated (slightly) from the insulator 108 around the circumference of the cable 102 using a hand tool and a gauge. Then, the conus ring of the RF connector 126 is slid into the separation between the outer conductor 110 and the insulator 108. Then, the clamp ring is worked back towards the conus ring, until the clamp ring abuts the conus ring. Then, the connector body is pushed onto the end of the cable 102, with the inner pin of the connector body inserted into to the inner conductor 104. Then, the clamping nut is screwed onto the threaded part of the connector body. It is to be understood that this is just one example of how a RF connector 126 can be attached to the cut end of the cable 102. It is to be understood that the RF connector 126 can be attached in other ways and/or other types of RF connectors 126 can be attached.

In general, the tool 100 can be used to cut the end of a cable 102 easily and uniformly without the use of a handsaw. Thus, the introduction of burrs, chips, and dirt that can result from using a handsaw to cut the cable 102 can be avoided. That is, the tool 100 and the method 1000 can be configured for burr-less and chip-less cutting and stripping of an RF radiating coaxial cable 102. Also, the careful and time-consuming cleaning that is required when a hand saw is used can be avoided. Moreover, the tool 100 easily, safely, and precisely strips the jacket 110 from the outer conductor 106 of the cable 102. As a result, PIM can be reduced and the reliability of the overall system can be increased.

Furthermore, the tool 100 is safer to use than hand saws and knifes or chisels.

A number of embodiments have been described. Nevertheless, it will be understood that various modifications to the described embodiments may be made without departing from the spirit and scope of the claimed invention.

Example Embodiments

Example 1 includes a tool to cut and strip a radiating coaxial cable comprising an inner conductor, an outer conductor coaxially arranged around the inner conductor, an insulator disposed between the inner conductor and the outer conductor, and a jacket coaxially arranged around the inner conductor and the outer conductor, the tool comprising: a first jaw; a second jaw; a linkage that couples the first jaw to the second jaw so that the first jaw and the second jaw are movable between an open state and a closed state; a cutting blade; and a stripping blade; wherein the first jaw and the second jaw are configured to receive and hold the cable therebetween when the first jaw and the second jaw are in the closed state; wherein the tool is configured to position at least a portion of the cutting blade to cut and sever the cable at a first point along the cable when the tool is rotated around the cable while the first jaw and the second jaw are in the closed state and the cable is received therebetween; and wherein the tool is configured to position at least a portion of the stripping blade to cut the jacket of the cable, without severing the cable, at a second point along the cable when the tool is rotated around the cable while the first jaw and the second jaw are in the closed state and the cable is received therebetween.

Example 2 includes the tool of example 1, wherein the tool is configured for burr-less and chip-less cutting and stripping of the radiating coaxial cable.

Example 3 includes the tool of any of examples 1-2, wherein the tool comprises a pliers having a first handle and a second handle, wherein the linkage is configured to couple the first and second handles to the first and second jaws, respectively, so that the first and second jaws are moved into the open state when the first and second handles are opened and so that the first and second jaws are moved into the closed state when the first and second handles are squeezed together.

Example 4 includes the tool of example 3, wherein the linkage comprises one of a two-bar linkage and a four-bar linkage.

Example 5 includes the tool of any of examples 3-4, wherein the pliers comprise a locking pliers, wherein the linkage comprises a locking mechanism to lock the first and second jaws in the closed state.

Example 6 includes the tool of example 5, wherein the locking mechanism comprises an adjustable locking mechanism.

Example 7 includes the tool of any of examples 1-6, wherein the stripping blade is attached to a side of the first jaw to position the stripping blade at the second point along the cable when the first jaw and the second jaw are in the closed state and the cable is received therebetween.

Example 8 includes the tool of any of examples 1-7, wherein the cutting blade has a point formed therein and a cutting edge, wherein the cutting edge cuts and severs the cable at the first point along the cable when the tool is rotated around the cable while the first jaw and the second jaw are in the closed state and the cable is received therebetween.

Example 9 includes the tool of any of examples 1-8, wherein the tool comprises a non-locking pliers.

Example 10 includes a method of cutting and stripping a radiating coaxial cable comprising an inner conductor, an outer conductor coaxially arranged around the inner conductor, an insulator disposed between the inner conductor and the outer conductor, and a jacket coaxially arranged around the inner conductor and the outer conductor, the method comprising: closing first and second jaws of a tool around the cable, wherein the tool further comprises a cutting blade and a stripping blade; rotating the tool around the cable to cut and sever the cable, wherein the tool is configured to position at least a portion of the cutting blade to cut and sever the cable at a first point along the cable when the tool is rotated around the cable while the first jaw and the second jaw are closed around the cable and wherein the tool is configured to position at least a portion of the stripping blade to cut the jacket of the cable, without severing the cable, at a second point along the cable when the tool is rotated around the cable while the first jaw and the second jaw are closed around the cable; removing a portion of the jacket resulting from cutting the jacket of the cable at the second point along the cable; and attaching a RF connector at an end of the cable resulting from cutting and stripping the cable using the tool.

Example 11 includes the method of example 10, wherein the method comprises a burr-less and chip-less method of cutting and stripping the radiating coaxial cable.

Example 12 includes the method of any of examples 10-11, further comprising at least one of: smoothing a portion of a raised line formed on the jacket of the cable before closing the first and second jaws around the cable; and lubricating the cable before closing the first and second jaws around the cable.

Example 13 includes the method of any of examples 10-12, wherein the tool further comprises a linkage that couples the first jaw to the second jaw so that the first jaw and the second jaw are movable between an open state and a closed state.

Example 14 includes the method of any of examples 10-13, wherein the tool comprises a pliers having a first handle and a second handle; and wherein closing the first and second jaws of the tool around the cable further comprises squeezing the first and second handles of the pliers to close the first and second jaws around the cable.

Example 15 includes the method of example 14, wherein the pliers comprise a locking pliers; and wherein closing the first and second jaws of the tool around the cable further comprises locking the first and second jaws around the cable.

What is claimed is:

1. A tool to cut and strip a radiating coaxial cable comprising an inner conductor, an outer conductor coaxially arranged around the inner conductor, an insulator disposed between the inner conductor and the outer conductor, and a jacket coaxially arranged around the inner conductor and the outer conductor, the tool comprising:
   a first jaw;
   a second jaw;
   a linkage that couples the first jaw to the second jaw so that the first jaw and the second jaw are movable between an open state and a closed state;
   a blade assembly mounted to the first jaw such that the first jaw is positioned between the blade assembly and the second jaw, the blade assembly including,
   a cutting blade coupled to the blade assembly, the cutting blade inserted in a slit in the first jaw and protruding into an area between the first and second jaws; and
   a stripping blade attached to an outer side of the blade assembly;
   wherein the first jaw and the second jaw are configured to receive and hold the cable therebetween when the first jaw and the second jaw are in the closed state;
   wherein the tool is configured to position at least a portion of the cutting blade to cut and sever the cable at a first point along the cable when the tool is rotated around the cable while the first jaw and the second jaw are in the closed state and the cable is received therebetween; and
   wherein the tool is configured to position at least a portion of the stripping blade to cut the jacket of the cable, without severing at least one of the outer conductor and the inner conductor of the cable, at a second point along the cable when the tool is rotated around the cable while the first jaw and the second jaw are in the closed state and the cable is received therebetween, the second point along the cable being spaced a select distance from the first point along the cable so that a portion of the jacket of the cable of the select distance from the first point along the cable can be stripped from the outer conductor of the cable.

2. The tool of claim 1, wherein the tool is configured for burr-less and chip-less cutting and stripping of the radiating coaxial cable.

3. The tool of claim 1, wherein the tool comprises a pliers having a first handle and a second handle, wherein the linkage is configured to couple the first and second handles to the first and second jaws, respectively, so that the first and second jaws are moved into the open state when the first and second handles are opened and so that the first and second jaws are moved into the closed state when the first and second handles are squeezed together.

4. The tool of claim 3, wherein the linkage comprises one of a two-bar linkage or a four-bar linkage.

5. The tool of claim 3, wherein the pliers comprise a locking pliers, wherein the linkage comprises a locking mechanism to lock the first and second jaws in the closed state.

6. The tool of claim 5, wherein the locking mechanism comprises an adjustable locking mechanism.

7. The tool of claim 1, wherein the stripping blade is attached to a side of the first jaw to position the stripping blade at the second point along the cable when the first jaw and the second jaw are in the closed state and the cable is received therebetween.

8. The tool of claim 1, wherein the cutting blade has a point formed therein and a cutting edge, wherein the cutting edge cuts and severs the cable at the first point along the cable when the tool is rotated around the cable while the first jaw and the second jaw are in the closed state and the cable is received therebetween.

9. A method of cutting and stripping a radiating coaxial cable comprising an inner conductor, an outer conductor coaxially arranged around the inner conductor, an insulator disposed between the inner conductor and the outer conductor, and a jacket coaxially arranged around the inner conductor and the outer conductor, the method comprising:

closing first and second jaws of a tool around the cable, wherein the tool further comprises a blade assembly having coupled thereto a cutting blade and a stripping blade, the blade assembly mounted to an outer surface of the first jaw such that the first jaw is positioned between the blade assembly and the second jaw, the cutting blade inserted in a slit in the first jaw and protruding into an area between the first and second jaws, the cutting blade piercing the cable when the first and second jaws are closed, the stripping blade coupled to an outer side edge of the blade assembly;

rotating the tool around the cable to cut and sever the cable, wherein the tool is configured to position at least a portion of the cutting blade to cut and sever the cable at a first point along the cable when the tool is rotated around the cable while the first jaw and the second jaw are closed around the cable and wherein the tool is configured to position at least a portion of the stripping blade to cut the jacket of the cable, without severing at least one of the outer conductor and the inner conductor of the cable, at a second point along the cable when the tool is rotated around the cable while the first jaw and the second jaw are closed around the cable, the second point along the cable being spaced a select distance from the first point along the cable so that a portion of the jacket of the cable of the select distance from the first point along the cable can be stripped from the outer conductor of the cable;

removing a portion of the jacket resulting from cutting the jacket of the cable at the second point along the cable; and attaching a RF connector at an end of the cable resulting from cutting and stripping the cable using the tool.

10. The method of claim 9, wherein the method comprises a burr-less and chip-less method of cutting and stripping the radiating coaxial cable.

11. The method of claim 9, further comprising at least of the following steps:

smoothing a portion of a raised line formed on the jacket of the cable before closing the first and second jaws around the cable; or lubricating the cable before closing the first and second jaws around the cable.

12. The method of claim 9, wherein the tool further comprises a linkage that couples the first jaw to the second jaw so that the first jaw and the second jaw are movable between an open state and a closed state.

13. The method of claim 9, wherein the tool comprises a pliers having a first handle and a second handle; and wherein closing the first and second jaws of the tool around the cable further comprises squeezing the first and second handles of the pliers to close the first and second jaws around the cable.

14. The method of claim 13, wherein the pliers comprise a locking pliers; and wherein closing the first and second jaws of the tool around the cable further comprises locking the first and second jaws around the cable.

* * * * *